United States Patent [19]

Brinkmann

[11] Patent Number: 4,664,548
[45] Date of Patent: May 12, 1987

[54] CONNECTING FITTING

[75] Inventor: Manfred Brinkmann, Hüllhorst, Fed. Rep. of Germany

[73] Assignee: Paul Hettich GmbH & Co., Kirchlengern, Fed. Rep. of Germany

[21] Appl. No.: 751,743
[22] PCT Filed: Oct. 24, 1984
[86] PCT No.: PCT/DE84/00220
§ 371 Date: Jun. 17, 1985
§ 102(e) Date: Jun. 17, 1985
[87] PCT Pub. No.: WO85/01996
PCT Pub. Date: May 9, 1985

[30] Foreign Application Priority Data

Oct. 28, 1983 [DE] Fed. Rep. of Germany ... 8330935[U]

[51] Int. Cl.⁴ .......................... B25G 3/00; F16D 1/00
[52] U.S. Cl. .................... 403/14; 403/231; 403/407.1
[58] Field of Search ............ 403/407.1, 231, 14

[56] References Cited

U.S. PATENT DOCUMENTS 4,502,807 3/1985 Salice .............................. 403/231 X

FOREIGN PATENT DOCUMENTS 434225 9/1926 Fed. Rep. of Germany.
692271 6/1940 Fed. Rep. of Germany.
794608 5/1958 United Kingdom.
2076104 11/1981 United Kingdom.
2098698 11/1982 United Kingdom.

Primary Examiner—Andrew V. Kundrat
Attorney, Agent, or Firm—Michael J. Striker

[57] ABSTRACT

A connecting fitting for detachable connection of furniture parts is provided with a spring mounted tongue on one fitting part engageable behind a protrusion on another fitting part and with the tongue being movable by an eccentric bolt with a protruding cam engageable with a protrusion on the tongue to disengage the tongue from the protrusion.

7 Claims, 9 Drawing Figures

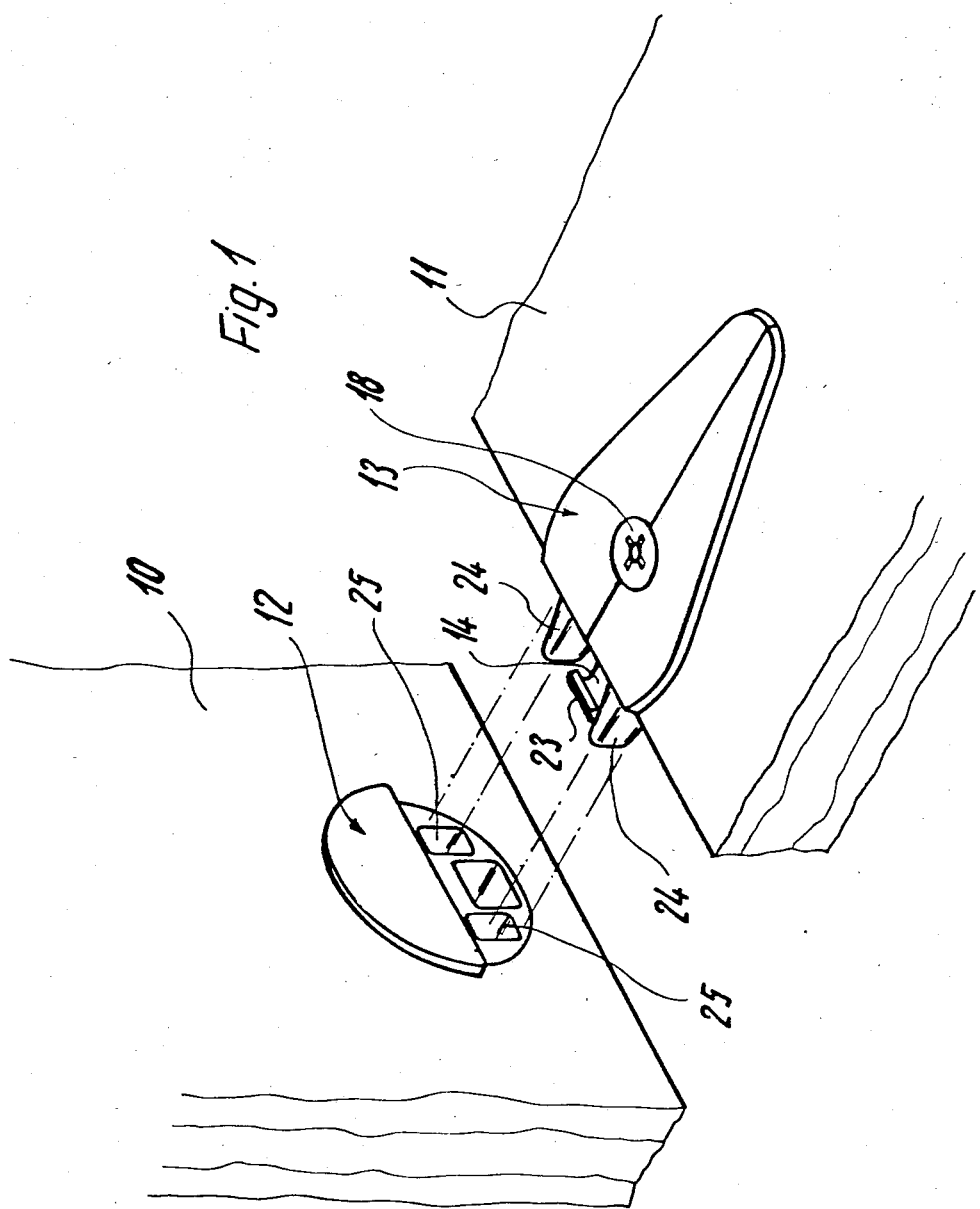

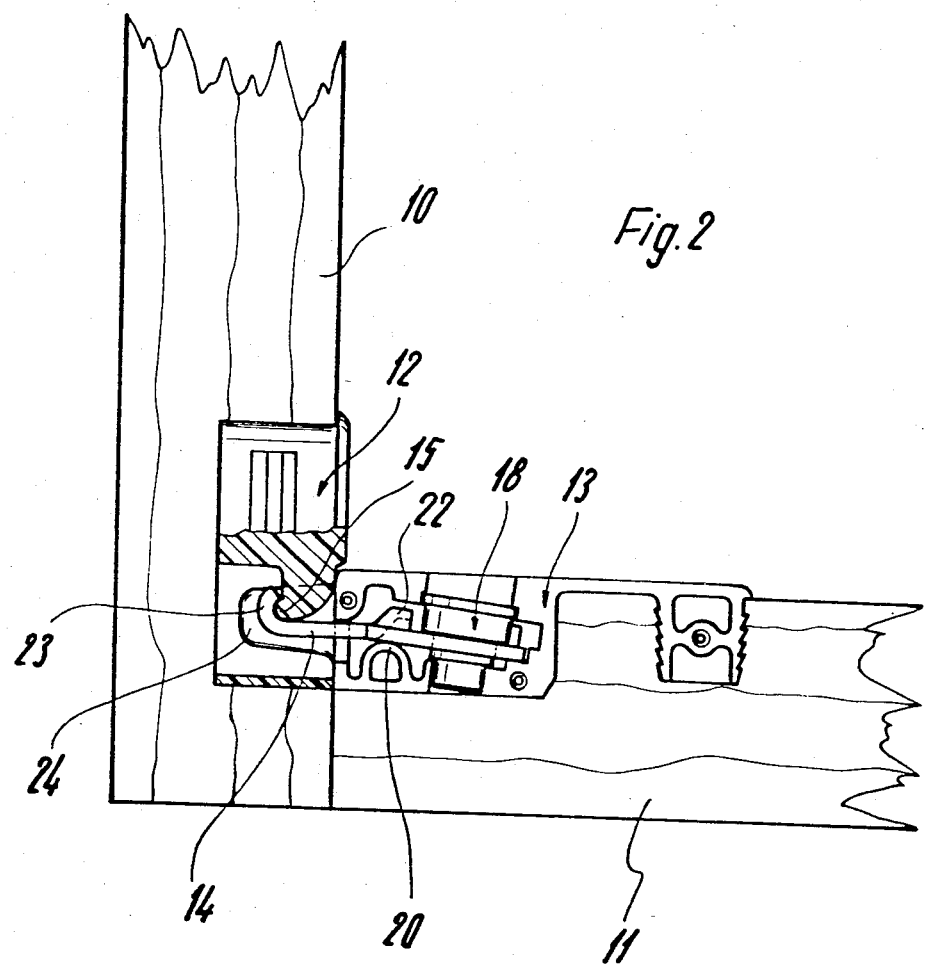

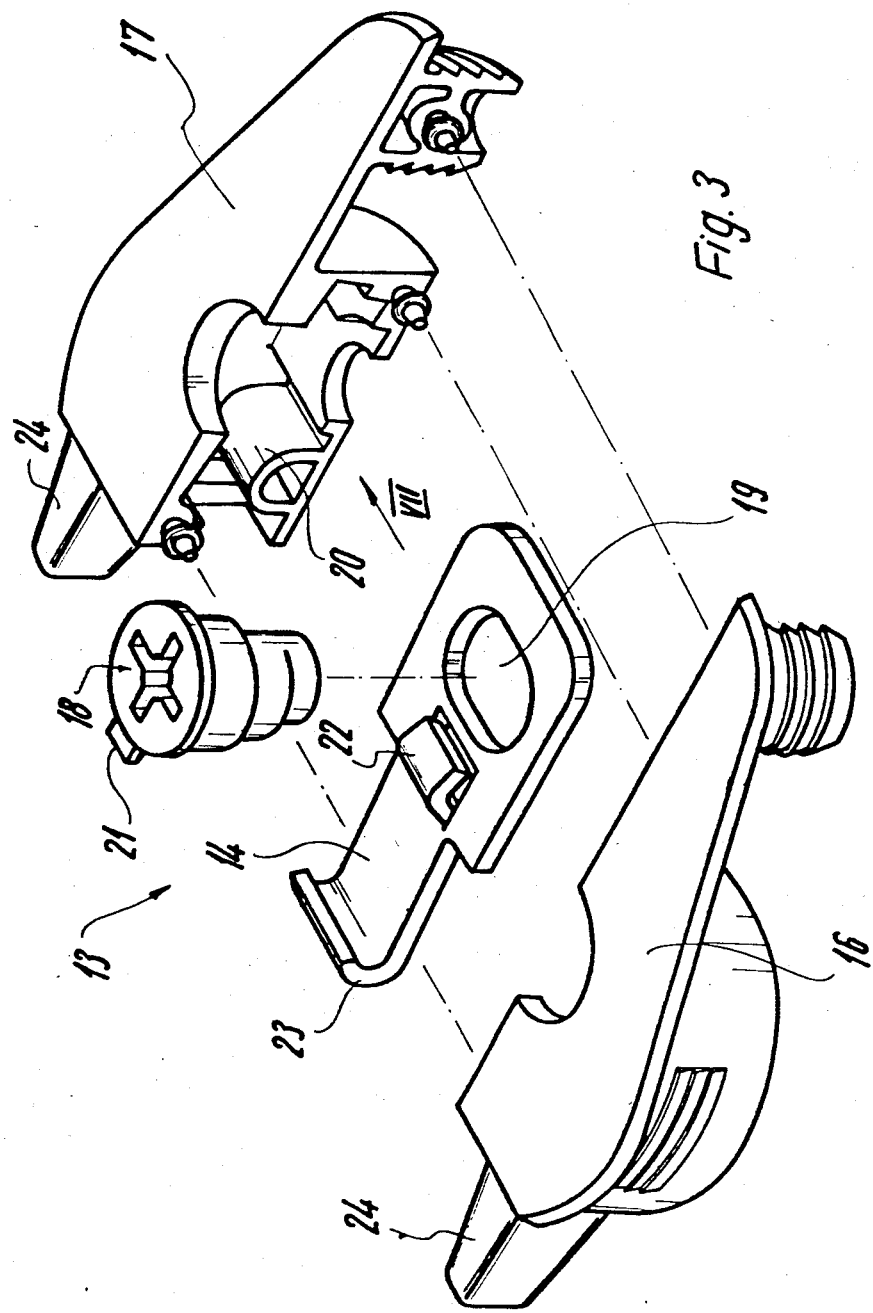

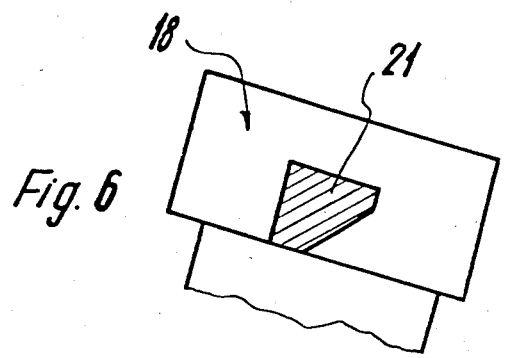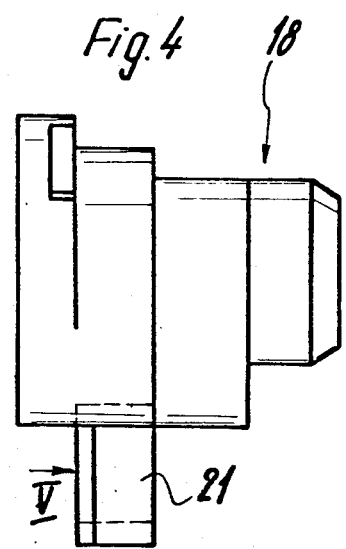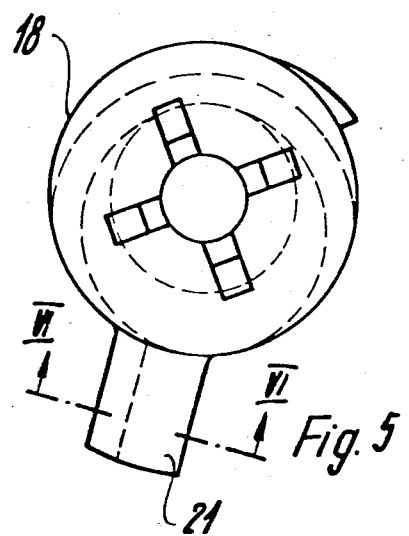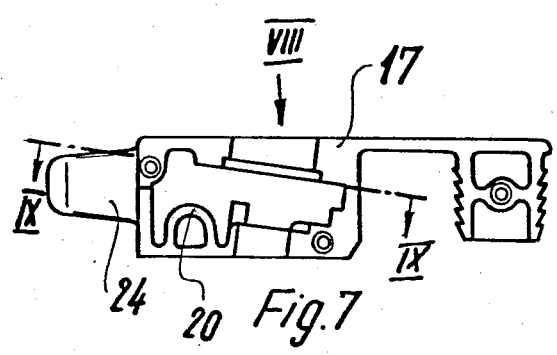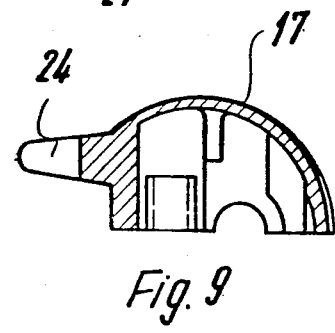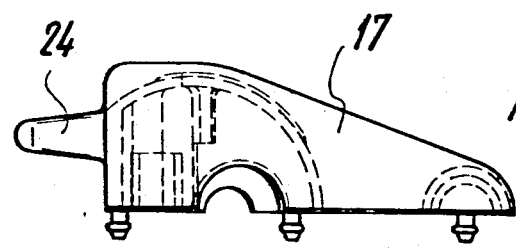

CONNECTING FITTING

BACKGROUND OF THE INVENTION

The subject invention relates to a connecting fitting for a detachable connection of two angularly abutting furniture walls, consisting of two each fittings which are mounted on one of the furniture walls, one of which is provided with a spring mounted holding tongue which is mounted transverse to its longitudinal axis and which extends into the other fitting and engages behind a stop protrusion of the corresponding fitting.

Connecting fittings of the type mentioned are known per se.

In a known connecting fitting of the type mentioned the holding tongue is mounted axially stationary in the corresponding fitting. The stop protrusion of the other fitting extends in an oblique position to a stop rib of the holding tongue, thus ensuring that the two furniture walls being connected be pulled solidly towards each other under any circumstances.

Such a structure requires the maintaining of very low tolerances, since otherwise the desired solid connection of the two furniture walls is not achievable.

SUMMARY OF THE INVENTION

It is an object of the present invention to provide an improved connecting fitting in such a manner that a solid pulling together of the furniture walls be connected be made possible even when relative large tolerances are present.

This object of the invention is solved by the connection fitting which includes:

(a) the holding tongue displaceably mounted within the first fitting in the direction of its longitudinal axis and movable by means of a clamping part, (b) the free end of the holding tongue is shaped as a catch hook and is deflected towards the fitting, and (c) a stop protrusion of the other fitting is undercut according to the deflection of the catch hook.

The inventive structure does not only offer the advantage that the overcoming of relative large tolerances is made possible, because the holding tongue can be moved over the clamping part in its longitudinal direction, but also permits a comfortable preassembling because due to the deflected catch hook, on the one hand, and the correspondingly undercut stop protrusion, on the other hand, so that the two furniture walls to be connected may be secured by assembling the two fittings at least to such an extent that an accidental release would be no longer possible.

Since normally a plurality of such connecting fittings are used when assembling a complete furniture, the individual furniture walls may at first be preassembled and subsequently the solid connection of the individual furniture walls may be accomplished by actuating the clampping parts of the individual fittings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective partial view of two furniture walls to be connected with each other;

FIG. 2 is a section through the connected furniture walls in accordance with FIG. 1 in the area of a connecting fitting according to the invention;

FIG. 3 is an exploded perspective view of a fitting of the connecting fitting in accordance with FIG. 2, before the final assembly;

FIG. 4 is a view of an eccentric bolt of the fitting in accordance with FIG. 3,

FIG. 5 is a view taken in direction of arrow V in FIG. 4;

FIG. 6 is a partial section in accordance with line VI—VI of FIG. 5;

FIG. 7 is a view in direction of arrow VII of FIG. 3;

FIG. 8 is a view taken in the direction of the arrow VIII in FIG. 7;

FIG. 9 a partial section in accordance with line IX—IX of FIG. 7.

DETAILED DESCRIPTION OF THE PREFERRED EMBODIMENTS

From FIGS. 1 and 2 it can be seen that two furniture walls 10 and 11 are connectable with each other by means of two fittings 12 and 13. The fitting 12 is inserted into the furniture wall 10 and the fitting 13 into the furniture wall 11.

As FIG. 2 illustrates the fitting 13 is provided with a holding tongue 14 which engages behind a stop protrusion 15 of the other fitting 12.

In particular from FIG. 3 it can be seen that the fitting 13 consists of two housing halves 16 and 17 which can be assembled with each other into which an eccentric bolt 18 is inserted in addition to the holding tongue 14.

This eccentric bolt 18 penetrates a recess 19 of holding tongue 14. By turning the eccentric bolt 18, the holding tongue 14 can be moved in the direction of its longitudinal axis relative to the longitudinal axis of the fitting 13.

The eccentric bolt 18 forms a clamping part with the assistance of which the holding tongue 14 can be displaced in direction of its longitudinal axis.

The fitting 13 which receives the holding tongue 14 is provided with spring yokes 20 on which the holding tongue 14 is supported with its front area. Thus, the holding tongue 14 is pushed upwardly by the spring yokes 20.

Naturally, it is also feasable to load the holding tongue 14 by pressure springs or other spring elements which are inserted into the fitting 13.

FIG. 3 as well as FIG. 6 illustrate that an outwardly protruding cam 21 is extended from the bolt 18. The holding tongue 14 is provided with a protrusion 22 in the pivot range of this cam. The holding tongue 14 is pushed downwardly against the force of the spring yokes 20 when the eccentric bolt 18 is turned within the fitting 13 to such an extent that the cam 21 acts on the protrusion 22 of the holding tongue 14.

The holding tongue 14 is provided with a catch hook 23 on its free end which is deflected towards fitting 13. As FIG. 2 illustrates, the stop protrusion 15 of the other fitting 12 has a corresponding undercut.

In furtherance, the fitting 13 is provided with two guide pins 24 which extend into corresponding recesses 25 of the other fitting 12, once the complete connecting fitting had been mounted.

The operation of the fitting as aforedescribed is as follows:

The two furniture walls 10 and 11 are moved together from their position illustrated in FIG. 1. The guide pins 24 of the fitting 13 are inserted into the recesses 25 of the other fitting 12. The holding tongue 14 is pushed out at a maximum from the fitting 13 by a corresponding turning of the eccentric bolt 18. The holding tongue 14 is pushed upwardly by the spring yoke 20 into the position which is illustrated in FIG. 2. The catch hook 23 of the holding tongue 14 is at first pushed downwardly from the stop protrusion 15 against the force of the spring yokes 20 when the front end of the holding tongue 14 is inserted into the other fitting 12. As soon as the catch hook 23 has overcome the stop protrusion 15, the holding tongue 14 is again pushed upwardly, so that the catch hook 23 is disposed behind the stop protrusion 15. A pulling back of fitting 13 is now no longer possible. When the eccentric bolt 18 is now turned, the holding tongue 14 is pulled back into the fitting 13, so that the catch hook 23 firmly engages on the stop protrusion 15 and firmly pulls the furniture wall 10 against the furniture wall 11.

A releasing of the connection is made possible in that the eccentric bolt 18 is turned to such an extent that not only the clamping between the two furniture walls 10 and 11 is neutralized, but also the holding tongue 14 is pushed downwardly from the engagement area of the stop protrusion 15 by means of cam 21.

The guide pins 24 extend beyond the holding tongue 14, so that the same are protected when the two fittings 12 and 13 are not yet connected with each other.

The first fitting 13 may have the shape of a chord like cut cylindrical disc in deviation from the illustrated embodiment. This shape is generally known in connecting fittings. In this case, it is advantageous to dispose the guide pins 24 in such a manner that they are disposed in the transition area between the chord like segment face and the cylindrical area, because with this measure it is assured that the first fitting 13 is safe against turning in a corresponding receiving bore of a furniture part.

It will be understood that each of the elements described above, or two or more together, may also find a useful application in other types of connection fittings differing from the types described above.

While the invention has been illustrated and described as embodied in a connection fitting, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a connecting fitting for a detachable connection of two angularly abutting furniture walls, consisting of two fittings which are mounted each on one of the furniture walls, one of the fittings being provided with a spring mounted-holding tongue which is mounted transverse to its longitudinal axis and which extends into the other fitting and engages behind a stop protrusion of the other fitting, the improvement comprising:
    (a) the holding tongue (14) being displaceably mounted within the one fitting (13) in a direction of its longitudinal axis and is movable by means of a clamping part, said clamping part being turnable to cause said displacement of the holding tongue;
    (b) a free end of the holding tongue (14) being shaped as a catch hook (23) and being deflected towards the one fitting (13);
    (c) stop protrusion (15) of the other fitting (12) being undercut according to the deflection of the catch hook (23);
    (d) said clamping part being a eccentric bolt (18) provided with a protruding cam (21); and
    (e) said holding tongue being provided with a protrusion (22) in a pivot range of said cam and cooperating with the same when said bolt is turned within said range.

2. Connecting fitting in accordance with claim 1, wherein the eccentric bolt (18) is mounted in the one fitting (13) and the holding tongue (14) has a recess (19) receiving said bolt.

3. Connecting fitting in accordance with claim 1, wherein the holding tongue (14) is yieldingly supported by means of spring yokes (20) which are provided on the one fitting (13).

4. Connecting fitting in accordance with claim 1, wherein the holding tongue (14) is longitudinally displaceable within the one fitting (13) by at least the same extent as the undercut of a stop protrusion (15).

5. Connecting fitting in accordance with claim 1, wherein the one fitting (13) is provided with two protruding guide pins (24) which engage into corresponding recesses (25) formed on the other fitting (12).

6. Connecting fitting in accordance with claim 5, wherein the guide pins (24) extent beyond the holding tongue (14).

7. Connecting fitting in accordance with claim 5, wherein the one fitting (13) is provided with a chord like cut cylindrical disc and the guide pins (24) are disposed in a cylindrical area of the one fitting (13).

* * * * *